United States Patent [19]
Coker et al.

[11] Patent Number: 5,255,131
[45] Date of Patent: Oct. 19, 1993

[54] ASYNCHRONOUS SERVO IDENTIFICATION/ADDRESS MARK DETECTION FOR PRML DISK DRIVE SSYTEM

[75] Inventors: Jonathan D. Coker; Richard L. Galbraith, both of Rochester, Minn.

[73] Assignee: International Business Machines Corporation, Armonk, N.Y.

[21] Appl. No.: 929,059

[22] Filed: Aug. 13, 1992

[51] Int. Cl.$^5$ ............................................. G11B 5/09
[52] U.S. Cl. .................................. 360/48; 360/77.08
[58] Field of Search .................... 360/48, 77.07, 77.08, 360/72.2, 49

[56] References Cited

U.S. PATENT DOCUMENTS

| | | | |
|---|---|---|---|
| 4,345,280 | 8/1982 | Blagosila et al. | 360/49 |
| 4,631,606 | 12/1986 | Sugaya | 360/78 |
| 4,786,890 | 11/1988 | Marcus et al. | 360/40 |
| 5,073,834 | 12/1991 | Best et al. | 360/77.08 |

Primary Examiner—John Shepperd
Assistant Examiner—Jhihan Clark
Attorney, Agent, or Firm—Joan Pennington; Richard E. Billion; Bradley A. Forrest

[57] ABSTRACT

Apparatus and method for asynchronous servo identification (SID)/address mark detection are provided for data detection in a partial-response maximum-likelihood (PRML) data channel. The SID/AM pattern includes a first preamble section defined by a plurality of short magnets; a body section defined by a predetermined number of long magnets; and a delimiter section defined by a plurality of short magnets. Samples from the digital filter are applied to first and second correlation filtering paths. The first correlation filtering path includes a polarity threshold function to indicate one of a preamble section or a delimiter section of a SID/AM pattern. The second correlation filtering paths includes a second threshold function and a comparator for sequentially comparing sequential ones of the received samples responsive to identifying the second threshold value to identify a predefined sequence. A count value is incremented responsive to each the identified predefined sequence to indicate a body section of the SID/AM pattern.

15 Claims, 4 Drawing Sheets

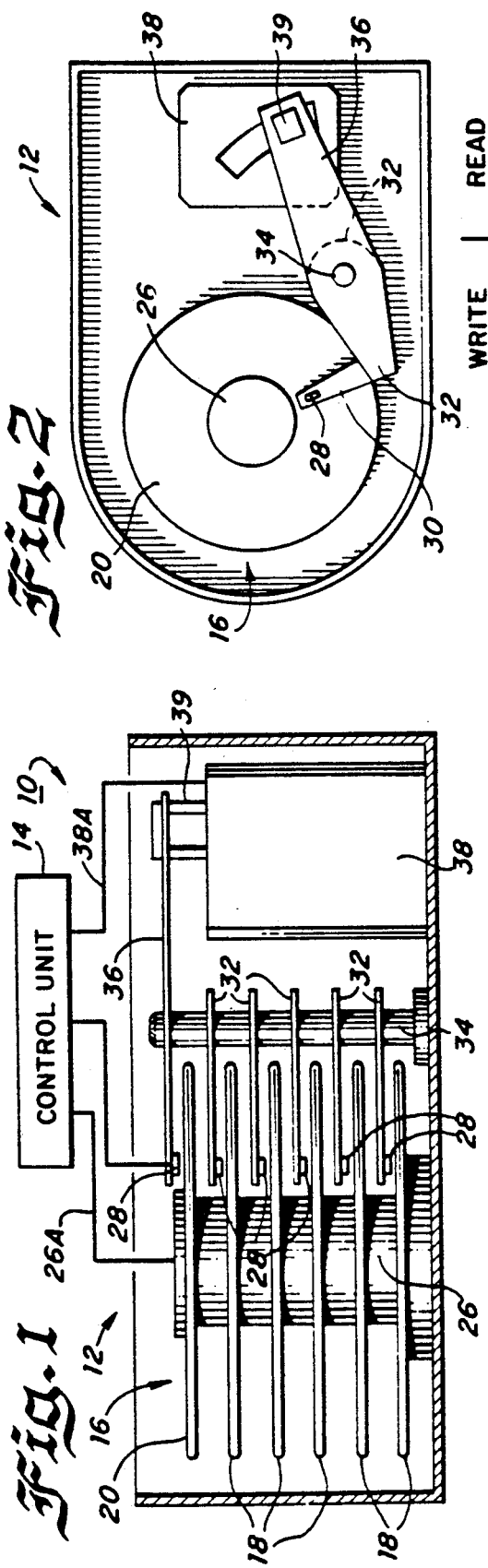

FREQUENCY RESPONSE

FREQUENCY RESPONSE

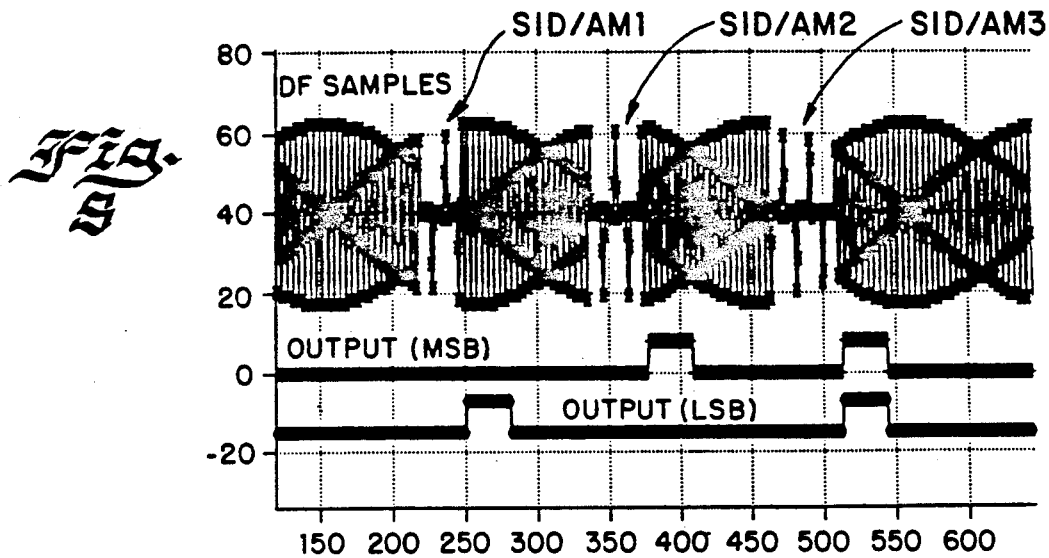
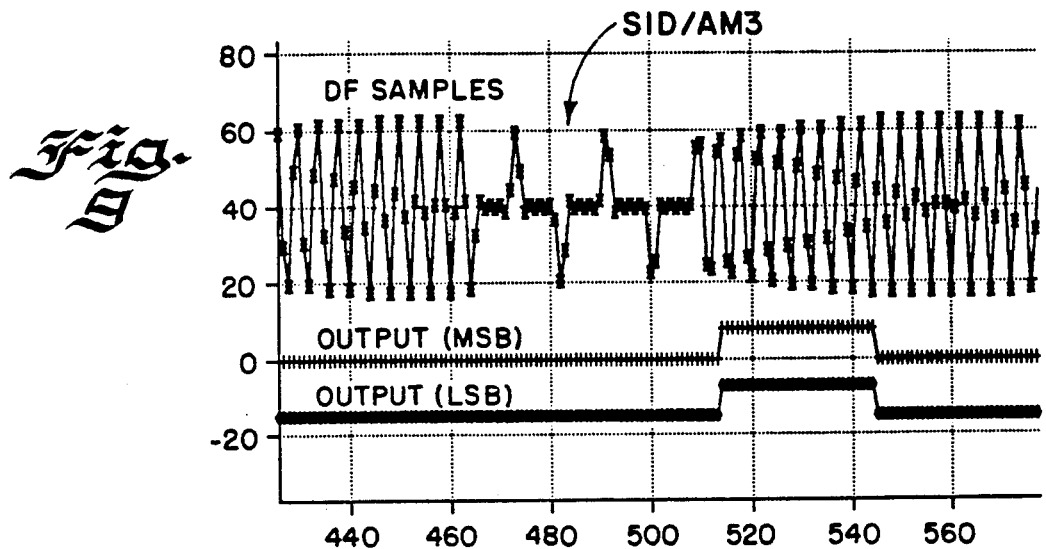
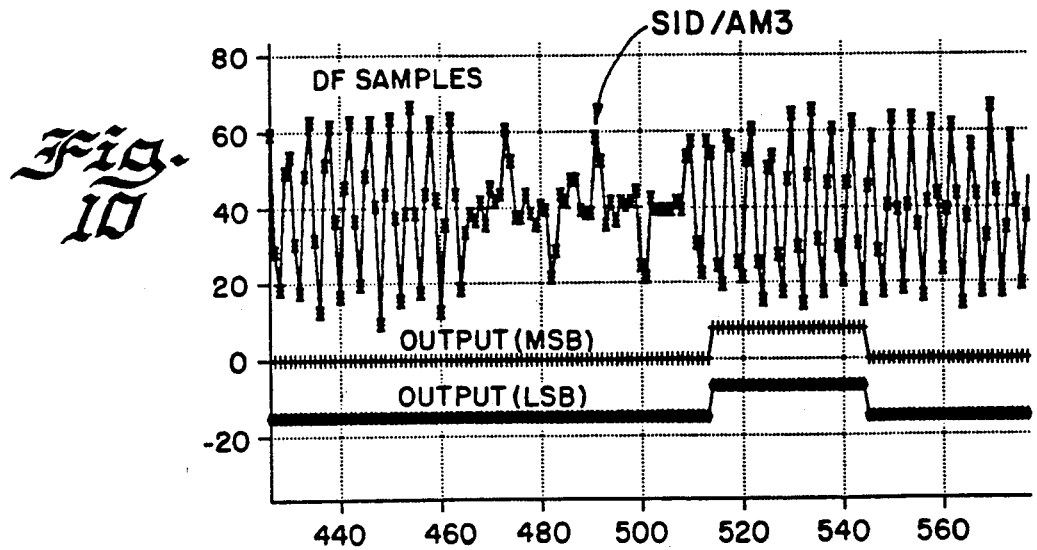

ASYNCHRONOUS SERVO IDENTIFICATION/ADDRESS MARK DETECTION FOR PRML DISK DRIVE SSYTEM

BACKGROUND OF THE INVENTION

1. Field of the Invention

The invention relates generally to a direct access storage device (DASD) of the type utilizing partial-response maximum-likelihood (PRML) detection, and more particularly to a method and apparatus for asynchronous servo identification (SID)/address mark detection for PRML data detection.

2. Description of the Prior Art

Computers often include auxiliary memory storage units having media on which data can be written and from which data can be read for later use. Disk drive units incorporating stacked, commonly rotated rigid magnetic disks are used for storage of data in magnetic form on the disk surfaces. Data is recorded in radially spaced data information tracks arrayed on the surfaces of the disks. Transducer heads driven in a path toward and away from the drive axis write data to the disks and read data from the disks.

In direct access storage devices (DASD's), it is necessary to measure the radial and circumferential position of the transducer heads flying above the disk surfaces. Radial position information is used to locate and maintain the head over circular tracks on the disk surface. Circumferential position information is used to identify the start of different information fields around the track circumference. The accuracy and reliability of head position measurements is very important, since poor tolerance in these measurements will degrade the performance and storage capacity of the DASD.

In known DASD implementations, the detection of special matchless, previously written readback waveforms furnish unique "timing marks" used to identify circumferential position. The technique of recording timing mark information on the disk surface is widely used because of its inherent accuracy and tracking. One common type of timing mark recorded on the disk surface is the servo identification (SID). SID patterns are written only once during manufacture and can serve two purposes. The main purpose of the SID is to identify the start of the servo position error signal (PES) burst. The PES burst is used in the calculation of the radial position of the head. The other purpose of the SID can be to identify track and sector types, for example, such as, index, non-index, and guardband. Identifying track and sector types is accomplished using multiple SID patterns that differ in some degree. Another common type of timing mark is the address mark (AM). AM patterns may be written many times during the operation of the DASD. The AM pattern is used to identify the start of data blocks and is used in count-key-data (CKD) architecture to support variable length data.

For example, U.S. Pat. No. 4,631,606 discloses a system for detecting multiple types of servo patterns.

Known arrangements for asynchronous timing mark detection based on peak-detection technology utilize a slope detector circuit. The slope detector circuit is supplied from a peak-detect channel to detect signal peaks in the readback waveform. Asynchronous windowing of the slope detector output is used to detect the presence of unique patterns. Unique patterns are derived using long magnet lengths which violate run-length code constraints and thus force exclusiveness from all valid customer data patterns. U.S. Pat. No. 4,786,890 discloses an example PRML modulation code and run-length constraints.

With the advent of the PRML channel, the traditional timing mark detection scheme has become quite burdensome. The required slope detector available in a peak-detect channel is not available from the PRML channel and must be constructed for the sole purpose of SID/AM detection. Also, with the increased need to integrate electronics for smaller DASD, the inefficiencies of the traditional SID/AM detection scheme have become quite apparent.

SUMMARY OF THE INVENTION

A principal object of the present invention is to provide improved methods for asynchronous servo identification (SID)/address mark detection for PRML data detection in a disk drive data storage system. Other objects are to provide such improved asynchronous servo identification (SID)/address mark detection methods substantially without negative effects, and in particular for the measurement of the circumferential position of a head flying above a disk; further that eliminates the need for a slope detector circuit, that utilizes signal processing elements available in a PRML channel; and that overcome many of the disadvantages of prior art arrangements.

In brief, the objects and advantages of the present invention are achieved by method and apparatus for asynchronous servo identification (SID)/address mark detection for data detection in a partial-response maximum-likelihood (PRML) data channel. The SID/AM pattern includes a first preamble section defined by a plurality of short magnets; a body section defined by a predetermined number of long magnets; and a delimiter section defined by a plurality of short magnets. Samples from the digital filter are applied to first and second correlation filtering paths. The first correlation filtering path includes a polarity threshold function to indicate one of a preamble section or a delimiter section of a SID/AM pattern. The second correlation filtering paths, includes a second threshold function and a comparator for sequentially comparing sequential ones of the received samples responsive to identifying the second threshold value to identify a predefined sequence. A count value is incremented responsive to each of the identified predefined sequences to indicate a body section of the SID/AM pattern.

BRIEF DESCRIPTION OF THE DRAWING

The present invention together with the above and other objects and advantages may best be understood from the following detailed description of the embodiment of the invention illustrated in the drawings, wherein:

FIG. 1 is a schematic and block diagram of a data storage disk file embodying the present invention;

FIG. 2 is a diagram showing the accessing mechanism for a single disk surface of the apparatus of FIG. 1;

FIG. 3 is a diagram illustrating a PRML data channel in the data storage disk file of FIG. 1;

FIGS. 6, 7, 8, 9 and 10 are graphs to illustrate the operation of asynchronous servo identification (SID)/address mark detection methods of the present invention.

DETAILED DESCRIPTION OF THE PREFERRED EMBODIMENT

Figure 5:
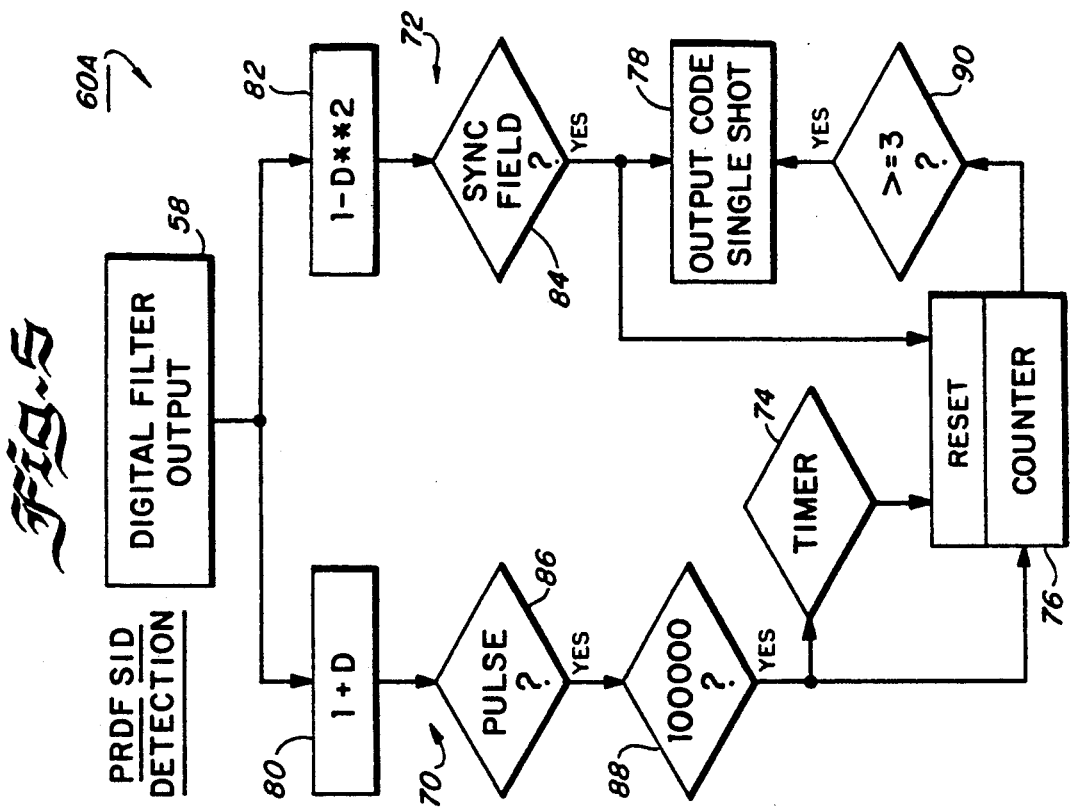
FIG. 5 is a block diagram illustrating apparatus for carrying out asynchronous servo identification (SID)/address mark detection according to methods of the present invention in the PRML data channel in the data storage disk file of FIG. 1.

In FIG. 1 there is shown a partly schematic block diagram of parts of a data storage disk file 10 including a data storage medium generally designated as 12 and an interface control unit generally designated as 14. In the preferred embodiment of this invention, the data storage medium 12 is embodied in a rigid magnetic disk drive unit 12, although other mechanically moving memory configurations may be used. Unit 12 is illustrated in simplified form sufficient for an understanding of the present invention because the utility of the present invention is not limited to the details of a particular drive unit construction.

Referring now to FIGS. 1 and 2 of the drawings, disk drive unit 12 includes a stack 16 of disks 18 having at least one magnetic surface 20. The disks 18 are mounted in parallel for simultaneous rotation on and by an integrated spindle and motor assembly 26. Data information on each disk 18 are read and/or written to by a corresponding transducer head 28 movable across the disk surface 20.

Transducer heads 28 are mounted on flexure springs 30 carried by arms 32 ganged together for simultaneous pivotal movement about a support spindle 34. One of the arms 32 includes an extension 36 driven in a pivotal motion by a head drive motor 38. Although several drive arrangements are commonly used, the motor 38 can include a voice coil motor 39 cooperating with a magnet and core assembly (not seen) operatively controlled for moving the transducer heads 28 in synchronism in a radial direction in order to position the heads in registration with data cylinders to be followed. The VCM is movable within a fixed magnetic field, and the direction and velocity of the coil movement is controlled by the current supplied. The various components of the disk file 10 are controlled in operation by signals generated by control unit 14 such as motor control signals on line 26A and position control signals on line 38A.

Referring now to FIG. 3, there is shown a block diagram of a PRML data channel 40 for carrying out asynchronous servo identification (SID)/address mark detection methods of the invention. The PRML recording channel uses class IV partial-response (PR) signals accomplished by a PR-IV filter function. Data to be written is applied to an encoder 42 for providing a modulation coded output having predefined run length constraints, such as for the minimum and maximum number of consecutive zeros and the maximum run length of zeros in the even and odd recorded sequences in the overall recorded sequence. A precoder 44 follows the encoder 42 described by a $1/(1-D^2)$ operation where D is a unit delay operator. A PRML precomp 46 coupled to the precoder 44 provides a modulated binary pulse signal applied to a write circuit 48 that provides the modulated write current for writing to the disk surface. An analog read signal is obtained at head and disk block 50 described by the $(1-D^2)$ operation. The read signal is applied to a variable gain amplifier (VGA) 52. The amplified read signal is applied to a lowpass filter 54. The filtered read signal is converted to digital form by an analog to digital converter (ADC) 56 that provides, for example, 64 possible 6-bit sampled values.

The samples of the ADC 56 are applied to a digital filter 58, such as a 10 tap finite impulse response (FIR) digital filter, and are applied to a gain and timing control 60. The gain and timing control 60 provides a gain and ac coupling pole control signal to the VGA 52 and provides a timing control signal to the ADC 56 via a voltage controlled oscillator 62. The filtered signal from the digital filter 58 is applied to a Viterbi decoder 64 coupled to a decoder 66 to complete the maximum-likelihood (ML) detection process for data read back.

In accordance with the feature of the present invention, asynchronous servo identification (SID)/address mark detection is an integrated function of the partial-response maximum-likelihood (PRML) recording channel 40 available in the disk file 10. Support for the writing and readback detection of SID/AM patterns is available within the PRML channel without the need for any additional external circuitry or control function. The matchless or unique patterns supported by this scheme occupy less area on the disk surface for example, 20% to 50% less as compared with the traditional SID/AM detection scheme. The current embodiment of the invention supports three uniquely identifiable pattern types illustrated in FIG. 4, and is easily extendable for support of more pattern types given the trade-off of longer pattern lengths. The asynchronous detection method of the invention can easily accommodate $+/-10\%$ frequency and $+/-30\%$ amplitude variations. Dual correlation filters, illustrated and described with respect to FIG. 5, are used to optimize the detection process. Head and disk variations are compensated since the detection scheme operates from the equalized partial response, class $-IV$ (PR4) samples.

Figure 4:
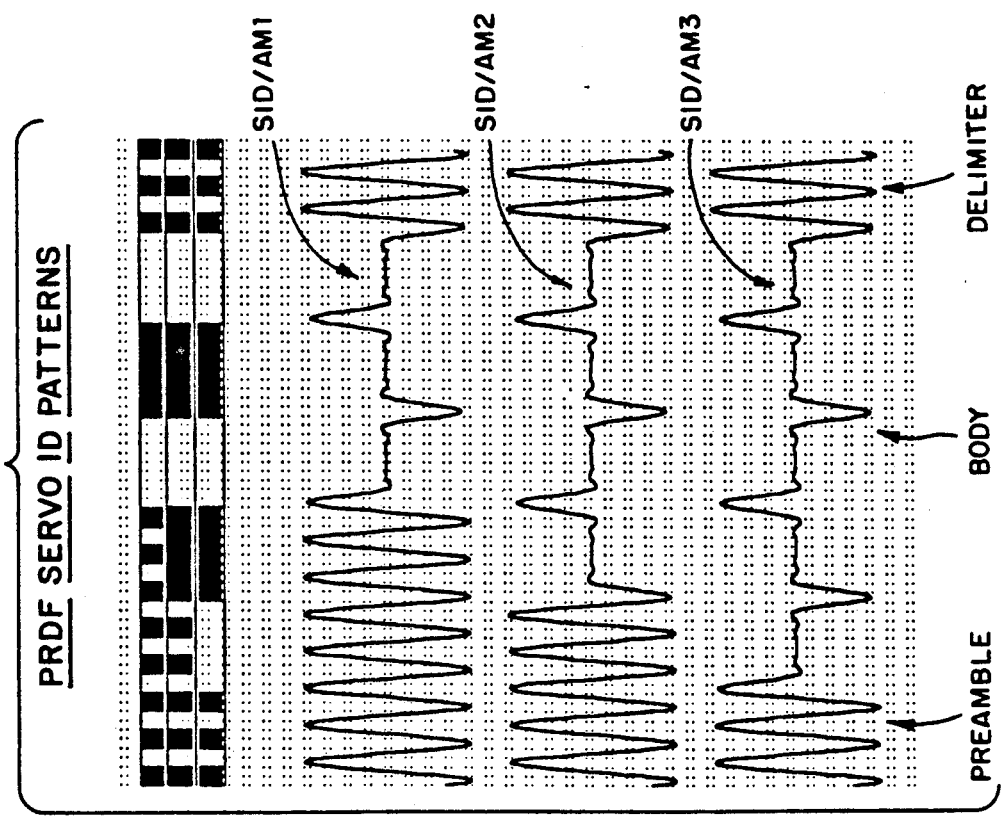
FIGS. 4 is a graph illustrating magnetization and equalized waveforms for three unique pattern waveforms according to the present invention in the data storage disk file of FIG. 1.

FIG. 4 illustrates three unique pattern waveforms of the invention generally designated-SID/AM 1, SID/AM 2 and SID/AM 3 for use the SID/AM detector 60A illustrated and described with respect to FIG. 5. The three pattern types SID/AM 1, SID/AM 2 and SID/AM 3 have been chosen so as to be matchless when compared to all of the valid encoded patterns possibly generated through the PRML encoder 42. The partial response digital filter (PRDF) servo ID patterns SID/AM 1, SID/AM 2 and SID/AM 3 consist of only 2-length magnets and either 9 or 10-length magnets. In FIG. 4 the magnetization and equalized waveforms for the three pattern types are illustrated. Since no 1-length magnets are used in the SID/AM patterns, no precomp is ever applied during the writing of these patterns.

Each SID/AM pattern includes a preamble, body, and delimiter section as indicated in FIG. 4. Each of the preamble, body, and delimiter pattern sections plays an important function in the detection method. The preamble section, consisting of short magnets, is used to initialize the detection algorithm to a reset state. The body section, consisting of 9 or 10 length magnets, provides the unique quality to the SID/AM patterns distinctive from all valid data patterns. The quantity or number of repetitions of long magnets in the body section differentiates the three pattern types as shown including 3, 4 or 5. The PRML code constraints do not allow the generation of repeated 9-long magnets. Since each pattern type contains at least 3 consecutive 9-long magnets, the uniqueness of the SID/AM patterns is guaranteed. Finally, the delimiter section, consisting of short magnets, signals the end of the pattern and triggers the detection algorithm to output the proper hardware code for the type of SID/AM pattern found.

FIG. 5 provides a block diagram of a SID/AM detector circuit is generally designated by the reference numeral 60A. The detector circuit 60A consists of two filtering-decision paths generally designated by 70 and 72, a watch dog timer 74, a long magnet counter 76 and an output code generator generally designated by 78. The input signal to the SID/AM detector circuit 60A consists of 6-bit digital sample values applied by the digital filter 58. The detection algorithm exclusively utilizes the equalized samples produced by the PRML channel. The use of equalized PRML samples provides a normalized signal response, since variations in head-disk frequency characteristics are normalized out by the adjustability of the PRML equalizer; however, the dual correlation scheme provides optimal detection in the presence of misequalization or track misregistration. The detector circuit 60A contains dual correlation filters 80 and 82 through which the input samples pass. A 1+D filter 80 is used to shape the input samples so as to optimally detect pulses in the digitized waveform. A 1−D**2 filter 82 is also used, and shapes the input samples so as to optimally detect the sync/sinewave produced by repeated 2-length magnets at the preamble and delimiter sections of the SID/AM patterns.

Figure 6:
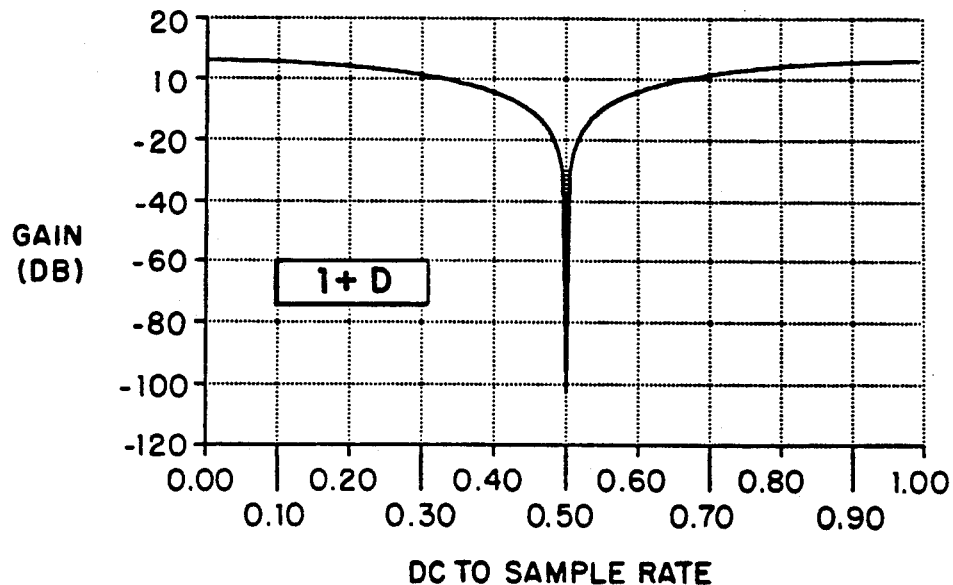
Figure 7:
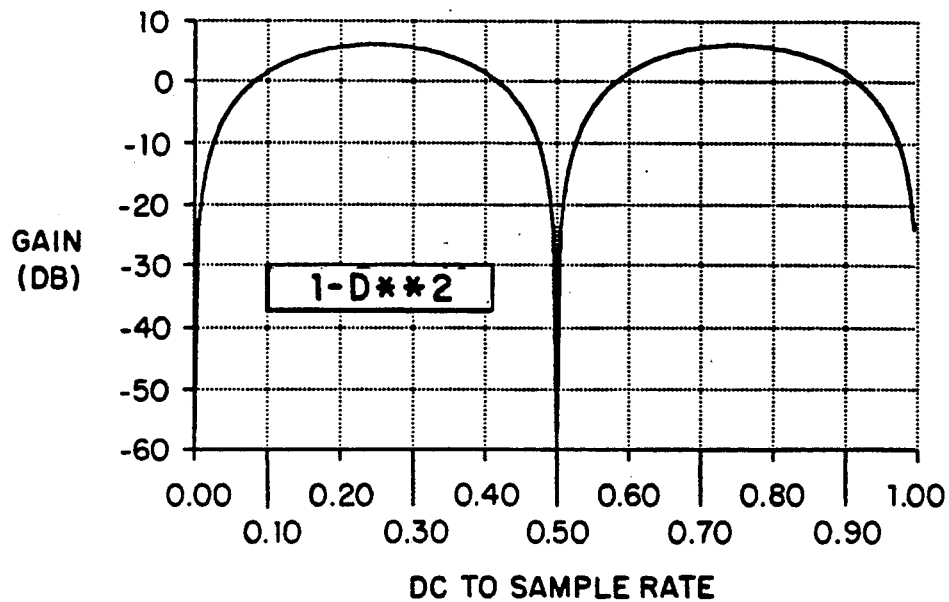

FIG. 6 illustrates the frequency response of the 1+D filter 80. The frequency response of the 1−D**2 filter 82 is shown as FIG. 7.

At the output of the 1−D**2 filter block 82, a polarity threshold is applied at a decision block 84 labelled SYNC FIELD? When a polarity threshold condition is met for three consecutive periods with alternating polarities, the presence of 2-length magnets, preamble or delimiter section is indicated at the output YES of decision block 84. This logical decision always resets the counter 76 used to count the quantity of long magnets and provides a trigger input to the code generator single shot 78.

At the output of the 1+D filter block 80, a non-polarity sensitive threshold is applied at a decision block 86 labelled PULSE? When the pulse threshold is exceeded, a positive or negative pulse in the sampled waveform is indicated at the output YES of decision block 86. This logical decision is applied to a sequence detector decision block 88 which looks for a 100000 six-period pattern. A 100000 sequence indicates that a long magnet body section of the SID/AM patterns has been found. The long magnet indication always increments the counter 76 for counting the quantity of long magnets. A counter value of greater than or equal to 3 is identified at a decision block 90 labelled >=3? and applied to the output code generator 78.

Operation of the SID/AM pattern detector 60A may be understood as follows. At the start of a SID/AM pattern, the preamble is recognized by the 1−D2 filtering logic path 72. The detected preamble section provides a reset for the detector circuit 60A, and resets the long magnet counter 76 and watch dog timer 74. As the body section of the SID/AM pattern is processed, the 1+D filtering logic path 70 sequentially increments the long magnet counter 76, counting the exact number of long magnets contained in the body section of the particular SID/AM pattern. The watch dog timer 74 is also reset when each long magnet is found. Then the 1−D2 filtering logic path 72 is again used to detect the delimiter section of the SID/AM pattern. When the long magnet counter 76 is greater than or equal to 3 when the delimiter section is found, a proper hardware code is output by the single shot 78 to indicate the type of SID/AM pattern found. The watch dog timer 74 is provided in order to prevent incorrect pattern recognition due to drop out defects in the readback signal. If the apparent spacing between adjacent long magnets or between the last long magnet and the delimiter section is greater than a predetermined number, for example, such as more than 13 periods, the watch timer 74 will time out and disable the operation of the detector circuit 60A.

Simulation of the SID/AM detector logic 60A incorporated into the PRDF data channel 40 is shown by FIG. 8. FIG. 8 illustrates the proper detection of the three SID/AM pattern types SID/AM 1, SID/AM 2 and SID/AM 3. FIG. 9 illustrates the detection of the 5 long-magnet pattern SID/AM 3 alone. FIG. 10 illustrates the robust detection of the 5 long-magnet pattern SID/AM 3 under noisy signal conditions.

What is claimed and desired to be secured by Letters Patent of the United States is:

What is claimed is:

1. A method of asynchronous servo identification (SID)/address mark detection for data detection in a partial-response maximum-likelihood (PRML) data channel including a digital filter, said method comprising the steps of:
   detecting a plurality of samples from the digital filter;
   applying said detected samples to a first correlation filtering path for identifying a polarity threshold value;
   applying said detected samples to a second correlation filtering path for identifying a second threshold value;
   sequentially detecting and comparing sequential ones of said samples responsive to identifying said second threshold value to identify a predefined sequence;
   incrementing a count value responsive to identifying said predefined sequence.

2. A method as recited in claim 1 further comprising the step of:
   recognizing a SID/AM pattern responsive to identifying both said polarity threshold value and a count value greater than a predetermined number.

3. A method as recited in claim 2 further includes the steps of:
   providing a timer for identifying a predetermined maximum number of periods between adjacent identified predefined sequences;
   disabling a SID/AM pattern recognition responsive to identifying said predetermined maximum number of periods.

4. A method as recited in claim 3 further including the steps of:
   providing said timer for identifying a predetermined maximum number of periods between each identified predefined sequence and said identified polarity threshold value.

5. A method as recited in claim 1 wherein the step of applying said detected samples to a first correlation filtering path for identifying a polarity threshold value includes the steps of:
   detecting alternating polarity threshold values for three consecutive periods to indicate one of a preamble section or a delimiter section of a SID/AM pattern.

6. A method as recited in claim 1 wherein said step of sequentially detecting and comparing sequential ones of said samples responsive to identifying said second threshold value to identify a predefined sequence includes the steps of:
identifying a predetermined number of predefined sequences to indicate a body section of a SID/AM pattern.

7. Apparatus for asynchronous servo identification (SID)/address mark (AM) pattern detection for data detection in a partial-response maximum-likelihood (PRML) data channel including a digital filter comprising:
first and second correlation filtering means for receiving samples from the digital filter;
said first correlation filtering means for identifying a polarity threshold value to indicate one of a preamble section or a delimiter section of a SID/AM pattern;
said second correlation filtering means for identifying a second threshold value and for sequentially comparing sequential ones of said received samples responsive to identifying said second threshold value to identify a predefined sequence;
counter means for incrementing a count value responsive to each said identified predefined sequence; and
means for generating a SID/AM recognition code responsive to both a predetermined count value and said means for identifying said polarity threshold value.

8. Apparatus as recited in claim 7 further comprising:
timer means for disabling said SID/AM recognition code generating means responsive to identifying a predetermined time period between adjacent identified predefined sequences.

9. Apparatus as recited in claim 8 wherein said timer means for disabling said SID/AM recognition code generating means is also responsive to identifying a predetermined maximum number of periods between each identified predefined sequence and an identified polarity threshold value by said first correlation filtering means.

10. Apparatus as recited in claim 7 wherein said means generating a SID/AM recognition code includes means for identifying one of multiple predefined SID/AM patterns responsive to said count value.

11. Apparatus as recited in claim 7 wherein said identified predefined sequence corresponds to a body section of a predefined SID/AM pattern defined by 9 or 10-length magnets.

12. A direct access storage device of the type including a partial-response maximum-likelihood (PRML) data channel comprising:
a housing;
at least one disk mounted in said housing for rotation about an axis and having at least one disk surface for storing data;
transducer means mounted for movement across said disk surface for reading and writing data and predefined types of SID/AM patterns to said disk surface; said predefined types of SID/AM patterns including a preamble section defined by short magnets, a body section defined by long magnets and a delimiter section defined by short magnets;
a digital filter coupled to said transducer means for providing digital sample values;
means coupled to said digital filter for polarity threshold comparing said digital sample values to detect one of said preamble section or said delimiter section;
means coupled to said digital filter for identifying a second threshold value and for sequentially comparing sequential ones of said received samples responsive to identifying said second threshold value to identify a predefined sequence indicating said body section;
counter means for incrementing a count value responsive to each said identified predefined sequence; and
means for generating a SID/AM recognition code responsive to both a predetermined count value and said means for identifying said polarity threshold value.

13. A servo identification (SID)/address mark (AM) pattern for use in a partial-response maximum-likelihood (PRML) data channel comprising:
a first preamble section defined by a plurality of short magnets;
a body section following said first preamble section defined by a predetermined number of long magnets; and
a delimiter section following said body section defined by a plurality of short magnets.

14. A SID/AM pattern as recited in claim 13 wherein said body section includes at least 3 long magnets.

15. A SID/AM pattern as recited in claim 13 wherein said body section consists of 9 or 10 length magnets and said first preamble section and said delimiter section consist of 2-length magnets.

* * * * *

UNITED STATES PATENT AND TRADEMARK OFFICE
CERTIFICATE OF CORRECTION

PATENT NO. : 5,255,131

DATED : October 19, 1993

INVENTOR(S) : Coker et al.

It is certified that error appears in the above-identified patent and that said Letters Patent is hereby corrected as shown below:

On the title page, item [54] and column 1, line 4, "SSYTEM" should read --SYSTEM--.

Signed and Sealed this

Eighth Day of March, 1994

*Attest:*

BRUCE LEHMAN

*Attesting Officer*     *Commissioner of Patents and Trademarks*